US006081303A

United States Patent [19]

Kim

[11] Patent Number: 6,081,303

[45] Date of Patent: Jun. 27, 2000

[54] METHOD AND APPARATUS FOR CONTROLLING A TIMING OF AN ALTERNATING CURRENT PLASMA DISPLAY FLAT PANEL SYSTEM

[75] Inventor: Se-Yong Kim, Seoul, Rep. of Korea

[73] Assignee: Daewoo Electronics Co., Ltd., Seoul, Rep. of Korea

[21] Appl. No.: 09/079,203

[22] Filed: May 15, 1998

[30] Foreign Application Priority Data

Jun. 20, 1997 [KR] Rep. of Korea ...................... 97-25971

[51] Int. Cl.[7] ................................ H04N 5/05; H04N 5/06

[52] U.S. Cl. .......................... 348/797; 348/524; 348/521; 327/115; 327/117; 327/151; 327/160

[58] Field of Search .................................... 348/797, 798, 348/800, 803, 792, 500, 521, 524, 536, 537, 547, 548; 327/115, 116, 117, 151, 144, 160, 295; 385/60, 63, 208; H04N 3/12, 5/66

[56] References Cited

U.S. PATENT DOCUMENTS

| | | | |
|---|---|---|---|
| 4,006,298 | 2/1977 | Fowler et al. | 345/147 |
| 4,017,719 | 4/1977 | Kaplan et al. | 327/115 |
| 4,020,626 | 5/1977 | Kuwabara et al. | 327/115 |
| 4,156,200 | 5/1979 | Gomez | 327/99 |
| 4,385,293 | 5/1983 | Wisnieff | 345/63 |
| 4,414,544 | 11/1983 | Suste | 345/63 |
| 5,475,448 | 12/1995 | Saegusa | 348/797 |

FOREIGN PATENT DOCUMENTS

| | | |
|---|---|---|
| 0 755 043 | 1/1997 | European Pat. Off. . |
| 07302061 | 11/1995 | Japan . |
| 2 229 847 | 10/1990 | United Kingdom . |

*Primary Examiner*—Michael H. Lee
*Attorney, Agent, or Firm*—Smith, Gambrell & Russell, LLP

[57] ABSTRACT

A method and an apparatus for control a timing in a flat panel display system are disclosed. In an alternating current plasma display system for respectively driving a plurality of subfields at every field in three steps such as a) entering and for eliminating a whole pixel for a first predetermined time, b) entering data for a second predetermined time and c) maintaining a discharge at every subfield for times which are different from one another, a first clock generator generates a first clock signal having a high frequency. A second clock generator generates a second clock signal having a low frequency. A first counter counts the second clock signal in response to a vertical synchronizing signal, and generates both a first pulse signal which sets the first and second predetermined times respectively in steps a) and b) in the respective subfield sections and a second pulse signal which sets times in step c) in the respective subfield sections which are different from one another. A second counter counts the second clock signal to detect time intervals of sections in steps a) and b) in response to the first pulse signal. A third counter counts the second clock signal in response to the second pulse signal to detect times in steps c) which are different from one another. A first control signal generator inputs outputs of the second and the third counters and the second clock signal, and generates timing control signals to drive a scan electrode, a maintenance electrode and an address electrode. A second control signal generator inputs both an output of the second counter and the first clock signal, and generates timing control signals to enter data. Consequently, a simplification of the design of the timing control apparatus and the decrease of a noise contribute to a cost reduction along with a reliability of the products.

13 Claims, 5 Drawing Sheets

METHOD AND APPARATUS FOR CONTROLLING A TIMING OF AN ALTERNATING CURRENT PLASMA DISPLAY FLAT PANEL SYSTEM

BACKGROUND OF THE INVENTION

1. Field of the Invention

The present invention relates to a method and an apparatus in which a timing control is performed in a flat panel display system which utilizes a red-green-blue strip-type plasma display panel.

2. Description of the Prior Art

Currently, as television sets (hereinafter, referred to as "TV") have become more widely used, consumers are demanding slim display apparatuses which have wide screens and which are easily installable. In view of consumers' needs, the existing cathode ray tube (referred to as "CRT") has started to reveal limitations thereof. Thus, the existing display equipment such as the CRT has come to be replaced by a so-called flat panel display (hereinafter, referred to as "FPD") apparatus that has a wide display area and that is slim as well. Further, recently, research projects therein are in progress enthusiastically at home and abroad.

This kind of the FPD device is largely divided into an emissive device and a non-emissive device. The emissive device is usually called an active emitting device and is a device which emits a light by itself. Representative examples of the emissive device are a field emission display (referred to as "FED") device, a vacuum fluorescent display (referred to as "VFD") type device, an electro-luminescence (referred to as "EL") type device, a plasma display panel (hereinafter, referred to as "PDP") and the like. The non-emissive device is called a passive light emitting device, and representative examples of the non-emissive device are a liquid crystal display (referred to as "LCD") device, an electro-chromic display (referred to as "ECD"), an electro-phoretic display (referred to as "EPID") and the like.

Currently, the LCD device occupies the main stream in products such as desk clocks, calculators, lap-tops and the like. However, when this device is adopted to television sets having the screen size of 21 inches and over, it also shows the limitations up to now due to problems in a manufacturing process of a panel and in obtaining an acceptable product. Further, it has the disadvantages of having a narrow visual field angle and of having a response rate which is subject to a temperature variation. Recently, the PDP is newly attracting public attention as the flat panel display of the next generation which is capable of solving the problems of the LCD device.

Because the PDP emits a light by itself in a principle which is similar to that of a fluorescent lamp, it has a uniform brightness and a high contrast although a screen area is as wide as the screen area of the CRT. In addition, the PDP has a visual field angle of 140 degrees and above, and is well-known as the best wide screen display device which has a screen size of 21 to 55 inches. The panel manufacturing process of the PDP is simplified as compared with that of the LCD device and thereby saves a manufacturing cost. However, because the manufacturing cost of the PDP is more than that of the CRT, manufacturers are carrying out searches to reduce the manufacturing cost.

The plasma display is largely classified into a direct current (referred to as "DC") type and an alternating current (referred to as "AC") type according to a structural difference of a discharge cell thereof and a form of a driving voltage based on the structural difference. The DC type is driven by a DC voltage, whereas the AC type is driven by a sinusoidal AC voltage or by a pulse voltage. The AC type includes such a structure that a dielectric layer covers an electrode to serve as a current regulation resistor, whereas the DC type includes such a structure that an electrode is exposed to a discharge room as it is and that a discharge current comes to flow during a supply of the discharge voltage. Because the AC type has the electrode which is covered with the dielectric, it is more durable than the DC type. The AC type has a further advantage in that a wall charge which is generated on a surface of the dielectric as a result of a polarization, causes the cell to have a memory function therein, and is more applicable in the field of display devices than the others.

A color PDP includes a structure of 3 terminals wherein a special electrode is installed in order to improve discharge characteristics thereof. Namely, the 3-terminal structure comprises 3 electrodes per unit cell for display which are an address electrode for entering data, a maintenance electrode for sequentially scanning a line and for maintaining a cell discharge, and a bus electrode for helping a discharge maintenance.

A number of the address electrode for entering data is determined in accordance to a horizontal resolution. For example, in the case where a number of samples per line is 853 for each of the red, green and blue colors, a total number of the samples comes to 2559. Therefore, a required number of the address electrodes is also 2559. In the case where an arrangement of the address electrode has a strip form, red, green and blue electrodes are arranged repeatedly.

As described above, because a circuit arrangement of an electrode driving section is restricted considering a space utilization when thousands the address electrodes are arranged on one side, an upper and lower electrode driving system is adapted wherein the section for driving 1280 electrodes, which are ordered in an odd-numbered sequence, are arranged at an upper end portion of a panel whereas the section for driving 1279 electrodes, which are ordered in an even-numbered sequence, are arranged at a lower end portion thereof (refer to U.S. Pat. No. 4,695,838).

Meanwhile, in order to display a TV signal of a system of national television system committee (hereinafter, referred to as "NTSC") on the PDP, a data processing section converts an interlaced scanning system into a sequential scanning system, and also converts data into data of a subfield system for a PDP contrast processing. Further, the data processing section provides 1280 red-green-blue (hereinafter, referred to as "RGB") pixel data per line to the electrode driving section for driving the upper and lower address electrodes of the panel of the PDP in harmony with the arrangement of the address electrode.

Conventionally, a video data processing section of the PDP comprises a data rearranging section for rearranging digital RGB sample data into subfield data for a contrast processing, a frame memory section for converting one scanning system into the other, a data interfacing section, and a timing control section.

In order to control the timing of respective parts of the video data processing section, the timing control section frequency-demultiplies a main clock and generates timing control signals of the respective parts.

Generally, in order to display a contrast in the PDP, every field is divided into a plurality of subfields which are utilized for displaying pixel data, and the respective subfields are driven by steps which are divided into an entry and elimination of a whole pixel, an entry of data and a maintenance of a discharge. Therefore, as 2559 pixel data has to be processed for a very short time, i.e., 3 [μs], per scan line, a frequency of a main clock of a system becomes very high. Namely, in the case where a resolution of the PDP is 3×853×480, the frequency of the main clock of approximate 50 [MHz] is necessary for processing the data. Then, the timing control section counts pulses by 50 [MHz] during one vertical period, and generates various timing control signals. For example, since one vertical period corresponds to 16.67 [ms] in the case of the NTSC, a twenty-bit counter is necessary for counting the pulses in a frequency of 50 [MHz].

However, when such a counter having many bit numbers is utilized, because an output of an upper bit position has a lot of skews generated therein as compared with that of a lower bit position, problems, such as glitches occurring during a decoding operation of the output values, are caused. Also, in the case where all of the outputs are intended to be synchronized with each other in order to solve the noise problems, the design of the counters becomes complicated.

SUMMARY OF THE INVENTION

Therefore, in order to solve the problems of the prior art as described above, it is an object of the present invention to provide a method and an apparatus for controlling a timing of an alternating current plasma display flat panel system wherein a clock signal having a high frequency is provided only when entering data and another clock signal having a relatively low frequency is provided during the remainder of an operation, so that a noise of a timing controller is eliminated and that a logic configuration of a circuit is simplified.

In order to achieve the above objects, the present invention provides a timing control method of an alternating current plasma display system for respectively driving a plurality of subfields at every field in three steps such as a) entering a wall charge into a whole pixel for a first predetermined time in the initial stage of every subfield and eliminating an entered whole pixel; b) while sequentially scanning a plurality of scan lines for a second predetermined time at every subfield, entering a relevant data in the line of unit and selectively forming the wall charge at a pixel intended to be discharged; and c) commencing to discharge a pixel having the wall charge which is formed therein for a mutually different time at every subfield and maintaining a commenced discharge, which comprises the steps of:

i) generating both a first clock signal having a high frequency for a data processing and a second clock signal having a low frequency for a system driving;

ii) counting the second clock signal in response to a vertical synchronizing signal, and generating both a first pulse signal which sets the first and second predetermined times respectively in steps a) and b) in the respective subfield sections and a second pulse signal which sets times in step c) in the respective subfield sections which are different from one another;

iii) counting the second clock signal to detect time intervals of sections in steps a) and b) in response to the first pulse signal;

iv) counting the second clock signal in response to the second pulse signal to detect times in steps c) which are different from one another;

v) inputting outputs in steps (iii) and (iv) and the second clock signal, and generating timing control signals to drive a scan electrode, a maintenance electrode and an address electrode; and vi) inputting both the output in step (iii) and the first clock signal, and generating timing control signals to enter data.

In order to achieve the above objects, the present invention provides a timing control apparatus of an alternating current plasma display system for respectively driving a plurality of subfields at every field in three steps such as a) entering a wall charge into a whole pixel for a first predetermined time in the initial stage of every subfield and eliminating an entered whole pixel; b) while sequentially scanning a plurality of scan lines for a second predetermined time at every subfield, entering a relevant data in the line of unit and selectively forming the wall charge at a pixel intended to be discharged; and c) commencing to discharge a pixel having the wall charge which is formed therein for a mutually different time at every subfield and maintaining a commenced discharge, which comprises:

a first clock generating means for generating a first clock signal having a high frequency for a data processing;

a second clock generating means for generating a second clock signal having a low frequency for a system driving;

a first counting means for counting the second clock signal in response to a vertical synchronizing signal, and for generating both a first pulse signal which sets the first and second predetermined times respectively in steps a) and b) in the respective subfield sections and a second pulse signal which sets times in step c) in the respective subfield sections which are different from one another;

a second counting means for counting the second clock signal to detect time intervals of sections in steps a) and b) in response to the first pulse signal;

a third counting means for counting the second clock signal in response to the second pulse signal to detect times in steps c) which are different from one another;

a first control signal generating means for inputting outputs of the second and the third counting means and the second clock signal, and for generating timing control signals to drive a scan electrode, a maintenance electrode and an address electrode; and a second control signal generating means for inputting both an output of the second counting means and the first clock signal, and for generating timing control signals to enter data.

In the method and apparatus for controlling a timing of an alternating current plasma display flat panel system according to the present invention, a simplification of the design of the timing control apparatus and the decrease of a noise contribute to a cost reduction along with a reliability of the products.

BRIEF DESCRIPTION OF THE DRAWINGS

The above objects and other advantages of the present invention will become more apparent by describing in detail preferred embodiments thereof with reference to the attached drawings, in which.

DESCRIPTION OF THE PREFERRED EMBODIMENT

A description will be given below in detail with reference to accompanying drawings of a configuration and an operation of a method and apparatus for controlling a timing of an alternating current plasma display flat panel system according to embodiments of the present invention.

Figure 1:
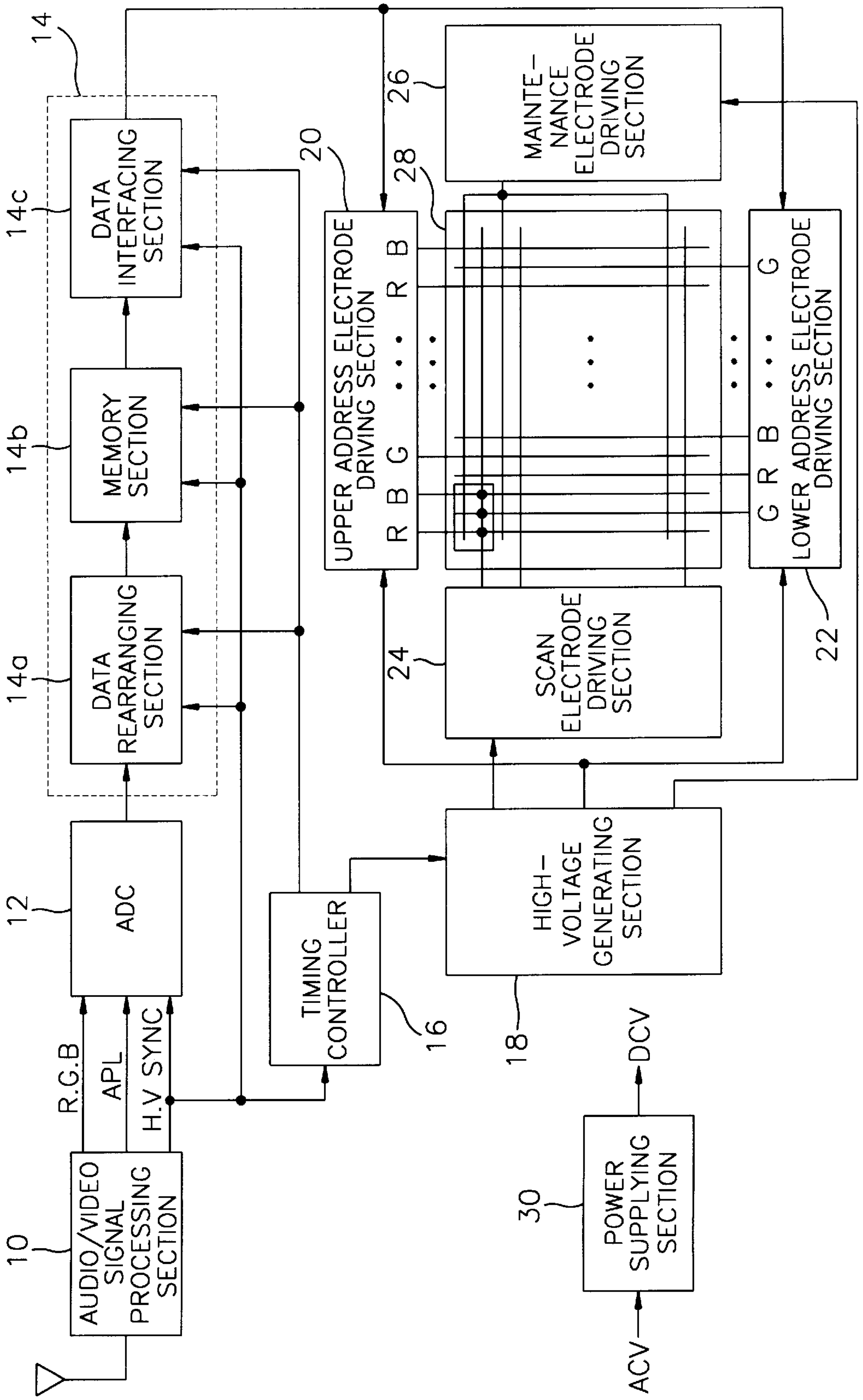
FIG. 1 is a block diagram for showing a circuit configuration of a plasma display panel television set which is a preferred embodiment of a flat panel display apparatus according to the present invention.

FIG. 1 is a block diagram for showing a circuit configuration of a plasma display panel television set which is a preferred embodiment of a flat panel display apparatus according to the present invention. A PDP-TV includes a video processing section for converting an NTSC composite video signal into a signal form which is adapted to the PDP-TV system, and a driving circuit section for displaying processed video data via a panel thereof.

Broadly speaking, a composite video signal which is received via an antenna, is analog-processed by an audio/video (referred to as "A/V") signal processing section 10, and an analog-processed signal is then digitized to a prescribed video signal by an analog-to-digital converter (referred to as "ADC") 12. Afterwards, while passing through a data rearranging section 14*a*, memory section 14*b* and data interfacing section 14*c* of a data processing section 14, this video data is converted into a data stream which is adapted to a contrast-processing characteristics of the PDP, and a converted data stream is then provided to an address electrode driving section 20 and 22.

A timing controller 16 provides a timing control signal to data processing section 14 and to a high-voltage generating section 18 in every field of unit in response to a vertical synchronizing signal Vsync. More detailed descriptions will be given later.

High-voltage generating section 18 provides a high-voltage control pulse which is required by an upper address electrode driving section 20, a lower address electrode driving section 22, a scan electrode driving section 24 and a maintenance electrode driving section 26, and a power supplying section 30 inputs an AC voltage (referred to as "ACV") to produce all of the DC voltages (referred to as "DCV's") which are required by a whole system.

A/V signal processing section 10 inputs the NTSC composite video signal to separate an analog RGB and a horizontal or vertical synchronizing signal H.V SYNC, and produces an average picture level (referred to as "APL") which corresponds to an average value of a luminance signal to and which is then provided to ADC 12.

The interlaced scanning system is adopted for the NTSC composite video signal whose one frame consists of two fields of respectively even- and odd-numbered sequences, and whose horizontal and vertical synchronizing signals have frequencies of 15.73 [KHz] and 60 [Hz], respectively. An audio signal which is separated from the composite video signal is directly provided to a speaker via an audio amplifier.

ADC 12 inputs the analog RGB signal to convert an inputted analog RGB signal into digital data, and provides converted digital data to data processing section 14. Here, the digital data is video data whose signal form is converted for a brightness improvement of the PDP-TV system. ADC 12 amplifies the analog RGB signal and the APL signal to have signal levels thereof which are adapted to a quantization, and converts the vertical and horizontal synchronizing signals to have prescribed phases thereof. Also, ADC 12 generates a clock by using a phase-locked loop (referred to as "PLL") in order to use a sampling clock as a clock which is synchronized with an input synchronizing signal.

The PLL compares a phase of a variable pulse from a loop with a phase of an input synchronizing signal, and provides a clock which is synchronized with the input synchronizing signal. In the case where the clock which is not synchronized with the input synchronizing signal is used, a vertical linearity of a picture to be displayed is not ensured.

Also, ADC 12 sets vertical and horizontal positions of a sampling area. In a vertical position section, only lines which include the video signal among the input signals are set. In a horizontal position section, only time which includes the video signal among the lines which is set to the vertical position, is set. Both the vertical position section and the horizontal position section are a reference for a sampling. As illustrated in Table 1, a total of 480 lines is selected in the 240 lines of units for the vertical position section. The horizontal position section has to correspond to a time interval in which at least 853 sampling clocks can exists per line.

TABLE 1

| | 1 frame | | |
|---|---|---|---|
| items | odd | even | remarks |
| a total line | 1H – 262.5H | 262.5H – 525H | NTSC TV |
| an active line | 22H – 263H | 284H – 525H | |
| a selective line | 23H – 262H | 285H – 524H | |

Also, ADC 12 maps the RGB data to data which coincides with a brightness characteristic of the PDP and outputs a mapped RGB data. Namely, ADC 12 includes a read only memory (referred to as "ROM") which has a plurality of vector tables recorded therein, and then maps an optimal vector table read from the ROM 1 to 1 in accordance with a digitized APL data to provide an improved form of RGB data to data processing section 14.

In order to process the contrast of the PDP, data rearranging section 14*a* of data processing section 14 is required to reconfigure the video data into a plurality of subfields, and then to rearrange data bits from the most significant bit (referred to as "MSB") to the least significant bit (referred to as "LSB"). Data rearranging section 14*a* performs rearrangement so that the video data provided in parallel may be stored at a location specified by an address of a frame memory as bits having the same weight.

Here, in order to distinguish data for the upper address electrode from data for the lower address electrode, there is configured one word in which among respective 8 1-bit data with respect to rearranged red and blue, 4 1-bit data in an odd-numbered sequence are placed at an upper bit while 4 1-bit data in an even-numbered sequence are placed at a lower bit, and in which among 8 1-bit data with respect to a rearranged green, four one-bit data in an odd-numbered sequence are placed at a lower bit while 4 1-bit data in an even-numbered sequence are placed at an upper bit.

Because memory section 14*b* of data processing section 14 divides one field into eight subfields for the contrast processing of the PDP, and reads in series the video data corresponding to respective subfields in harmony with an arrangement order of the electrodes to provide the read video data to data interfacing section 14*c*, a read order is quite different from a write order structurally.

Data interfacing section 14*c* rearranges the RGB data from memory section 14*b* in harmony with an arrangement of an RGB pixel of a display section 28 and provides a rearranged RGB data to an address driving integrated circuit (referred to as "IC"). Namely, data interfacing section 14*c* provisionally stores the RGB data from memory section 14*b* and then respectively provides read RGB data to upper and lower address electrode driving sections 20 and 22 in a data form which is required by upper and lower address electrode driving sections 20 and 22.

In response to a synchronizing signal, timing controller 16 provides both a clock signal and control pulses which are required by respective parts of the circuit. More detailed descriptions will be given later.

High-voltage generating section 18 combines the DC high-voltages with each other in accordance with a control pulse having various logic levels from timing controller 16, and produces the high-voltage control pulse which is required by upper address electrode driving section 20, by lower address electrode driving section 22, by scan electrode driving section 24 and by maintenance electrode driving section 26, and which enables the PDP to be driven. Upper and lower address electrode driving sections 20 and 22 adequately heighten a voltage level of the data from data interfacing section 14*c* and a selective entry can be executed into display section 28.

Namely, a driving method for the contrast processing of the PDP according to the present invention, first, divides one field into a plurality of subfields, i.e., 256 contrast—8 subfields, and enters the video data corresponding to respective subfields in the line of unit into display section 28 via upper and lower address electrode driving sections 20 and 22. The method sets a number of a discharge maintenance pulses to a smaller one in an order starting from the subfield having MSB data entered therein to the subfield having LSB data entered therein, and comes to perform the contrast-processing on the basis of a total discharge maintenance period according to a combination therebetween.

The same data is displayed twice in even and odd fields and thereby eliminates a flickering which accompanies a non-interlacing scan. A driving order of the divided subfields is described as follows.

a) Step for entering and for eliminating a whole pixel:

In order to eliminate a wall charge which remains at a selected pixel after a discharge maintenance of a previous subfield, the wall charge is entered into a whole pixel for a first predetermined time which is short enough to be invisible, and the whole pixel is then eliminated to eliminate all of the remaining wall charges and an initialization is achieved.

b) Step for entering data:

While shifting a scan pulse in sequence at a scan electrode for a second predetermined time, a relevant data is entered in the line of unit via an address electrode, and thereby selectively forming the wall charge at a pixel which is intended to be discharged.

c) Step for maintaining a discharge:

The discharge of a pixel having the wall charge which is formed therein while alternately applying the maintenance pulse between the maintenance electrode and the scan electrode is initiated and is then maintained. At this time, because there exists such a possibility that a peripheral pixel, which is entered, influences another pixel, which is not entered, to produce an erroneous discharge, an elimination of a narrow range is performed every time after applying the maintenance pulse, and a correct discharge is then performed. In the step for maintaining a discharge, a discharge maintenance time is varied depending on a weight of the subfield. For example, the discharge maintenance time of a subfield which is configured with MSB values becomes longest, whereas that of another subfield which is configured with LSB values becomes shortest. Although the discharge maintenance times of these subfields increase exponentially in general, the discharge maintenance times are so properly adjusted that a contrast display which is visually most natural is obtained by experiment.

Figure 2:
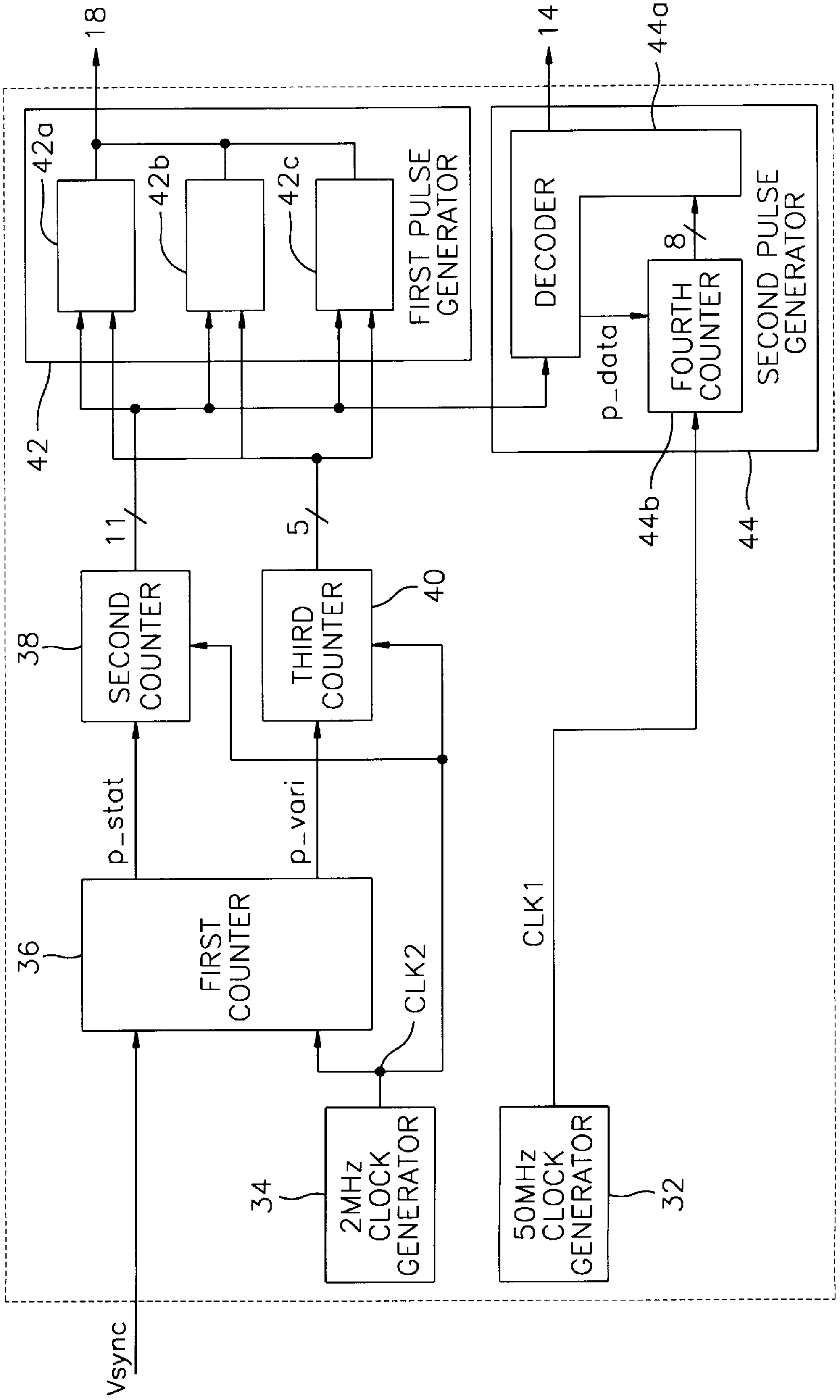
FIG. 2 is a schematic diagram for showing a circuit configuration of a preferred embodiment of a timing controller according to the present invention.

FIG. 2 is a schematic diagram for showing a circuit configuration of a preferred embodiment of a timing controller according to the present invention.

As shown in FIG. 2, a timing controller 16 includes a first clock generator 32, a second clock generator 34, a first counter 36, a second counter 38, a third counter 40, a first control signal generator 42 and a second control signal generator 44.

In order to process data, first clock generator 32 generates a first clock signal CLK1 which has a high frequency of 50 [MHz]. In order to operate a system, second clock generator 34 generates a second clock signal CLK2 which has a low frequency of 2 [MHz].

In order to provide a main clock for driving the system, first counter 36 is initialized by vertical synchronizing signal Vsync and counts second clock signal CLK2 to detect one vertical period. As the one vertical period corresponds to 16.67 [ms] in the NTSC system, 16.67 [ms]/500 [ns]=33,340 clocks are required for counting a 2 [MHz] clock to detect the one vertical period. Therefore, first counter 36 is configured with a 16-bit binary counter. Consequently, in the case where a counter counts pulses which are included in a 50 [MHz] clock, a 20-bit binary counter is required. However, a logic configuration can be simplified by utilizing a 16-bit binary counter in the present invention. Output values of the counter are combined with each other by a preset decoder, and are respectively outputted as a first pulse signal p__stat which sets the first and second predetermined times respectively in steps a) and b), and outputted as a second pulse signal p__vari which sets times in step c) which are different from one another.

Second counter 38 is configured with a eleven-bit binary counter which starts to count second clock signal CLK2 at a leading edge of first pulse signal p__stat, and resets at a trailing edge thereof. Therefore, second counter 38 counts the first and second predetermined times, e.g., 100 [$\mu$s] and 3 [$\mu$s]×481 [scan lines]=1443 [$\mu$s] respectively, respectively in steps a) and b), and outputs counted values.

Third counter is configured with a five-bit binary counter which starts to count second clock signal CLK2 at a leading edge of second pulse signal p__vari, and resets at a trailing edge thereof. Therefore, second counter 38 repeatedly counts a minimal unit time, e.g., a minimum, 10 [$\mu$s], in an active section of second pulse signal p__vari among discharge maintenance times in step c), and outputs counted values. Namely, while the discharge maintenance period of the MSB subfield is 1280 [$\mu$s], third counter 40 repeatedly counts the pulses over 128 times.

First control signal generator 42 inputs the counted values which are supplied from second and third counters 38 and 40. The inputted count values are respectively provided to a discharge maintenance electrode control signal generating section 42*a,* a scan electrode control signal generating section 42*b* and an address electrode control signal generating section 42*c,* and each of the generating sections decode these inputted count values to generate timing control signals which correspond to the respective electrodes. The generated timing control signals are provided to high-voltage generating section 18.

Second control signal generator 44 inputs the counted values from second counter 38, and decoder 44*a* which is configured with a logic circuit and which is included in second control signal generator 44 decodes the counted values. Decoder 44*a* generates third pulse signal p_data which corresponds to second predetermined time, i.e., 1443 [μs] in step b).

Also, in order to generate 107 shift pulses for controlling an input of data interfacing section 14*a,* second control signal generator 44 includes an eight-bit binary counter 44*b* which can count 50 [MHz] clocks up to 150 for 30 [μs]. Eight-bit binary counter 44*b* starts to count the pulses at a leading edge of third pulse signal p_data and comes to repeatedly count 481 times in total by 3 [μs]. An output of eight-bit binary counter 44*b* is provided to decoder 44*a*. Additionally, decoder 44*a* generates various timing signals which are necessitated by data rearranging section 14*a,* memory section 14*b* and data interfacing section 14*c* all of which are included in data processing section 14.

Figure 3:
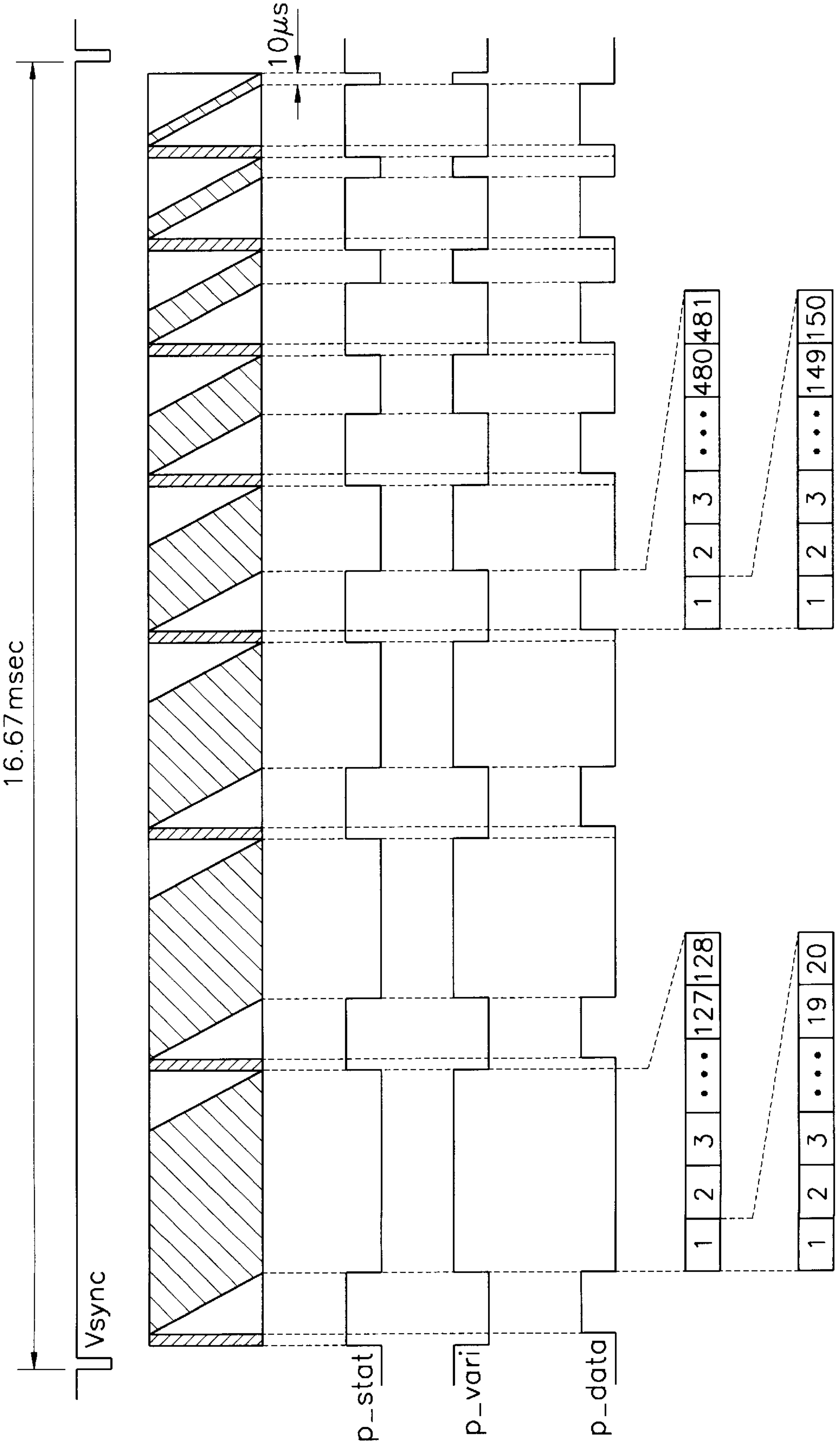
FIG. 3 is a timing chart for illustrating a method for controlling a timing of an alternating current plasma display flat panel system according to a preferred embodiment of the present invention.

FIG. 3 is a timing chart for illustrating a method for controlling a timing of an alternating current plasma display flat panel system according to a preferred embodiment of the present invention. As shown in FIG. 3, one vertical period is divided into eight subfield driving periods and respective subfield driving periods are separated into three steps in steps a), b) and c). Steps a) and b) are composed of equal times at every subfield, respectively, whereas step c) is composed of times which are different from one another according to a weight which is given to every subfield. In an illustrated example, these times in steps a), b) and c) are represented by the discharge maintenance times which increase exponentially.

In the present invention, so as to simplify a logic configuration of a timing control apparatus and to reduce a glitch noise, the 2 [MHz] clock is utilized in steps a) and c) both of which require a low-speed clock, whereas the 50 [MHz] clock is utilized in step b) which requires a high-speed clock.

Also, a long period of time is counted in step c) in such a manner that a least unit time is repeatedly counted, and 1443 [μs] is counted in step b) in such a manner of repeating a counting in 3 [μs] units, and thereby leading to the simplification of a logic design of each counter and the reduction of a noise.

Figure 4:
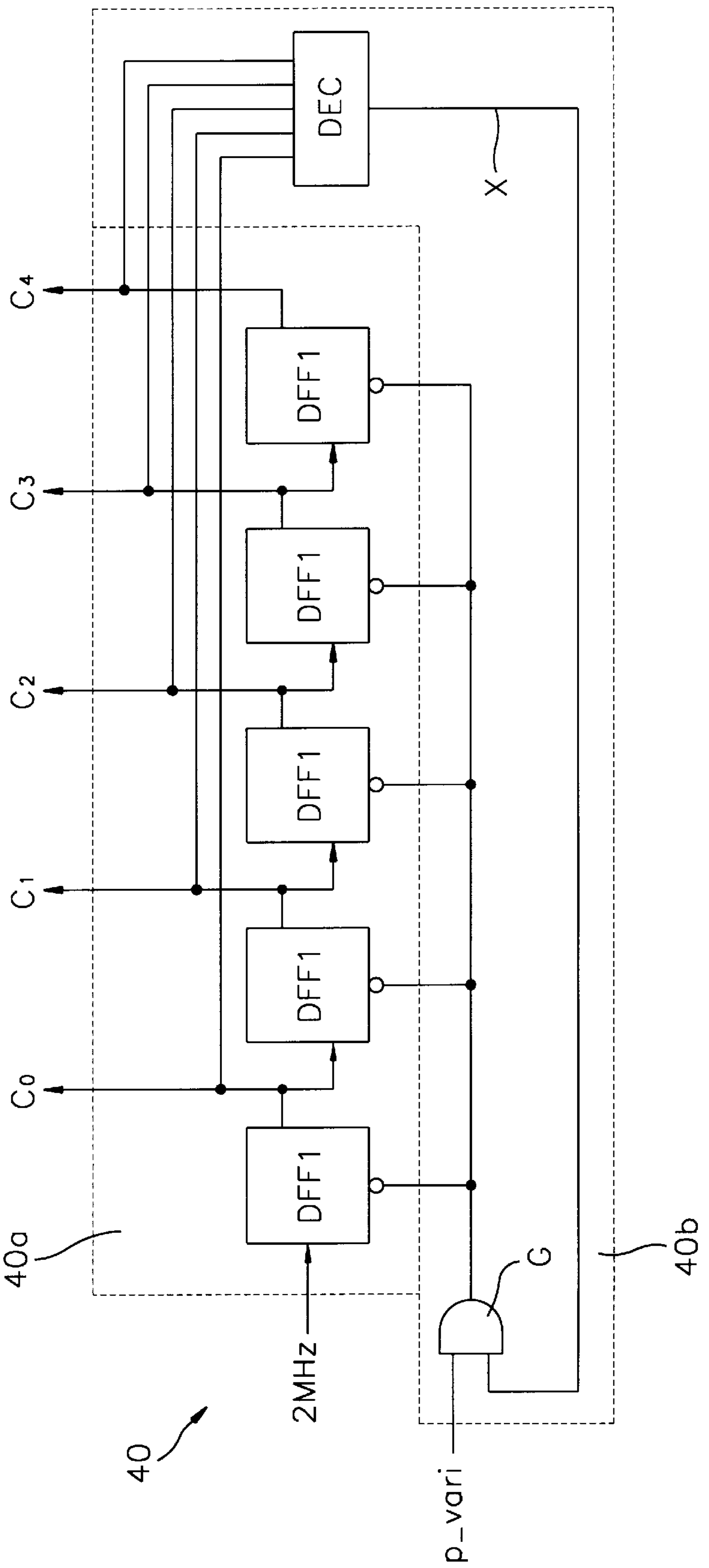
FIG. 4 is a timing chart for showing a circuit configuration of a preferred embodiment of a third counter shown in FIG. 2.
Figure 5:
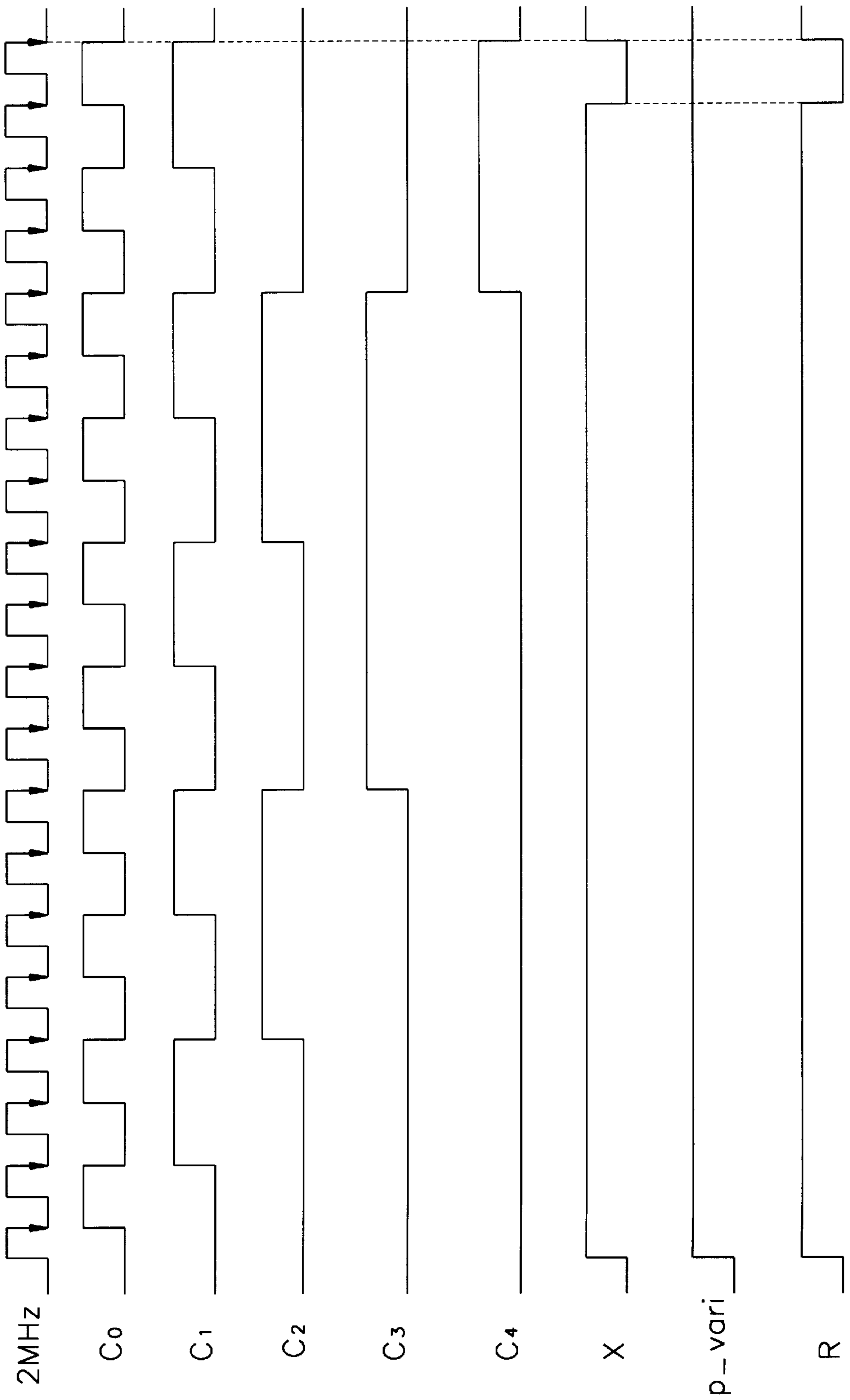
FIG. 5 is a timing chart for showing waveforms of respective parts shown in FIG. 4.

FIG. 4 is a timing chart for showing a circuit configuration of a preferred embodiment of a third counter shown in FIG. 2. FIG. 5 is a timing chart for showing waveforms of respective parts shown in FIG. 4. A preferred embodiment of third counter 40 shown in FIG. 2, includes both a five-bit binary counter 40*a* and a decoder 40*b*. Counter 40*a* which inputs a clock signal of 2 [MHz] as a clock, includes five D flip-flops DFF1 to DFF5 which are connected to one another in a dependent manner, and has such a configuration as being reset by an output of decoder 40*b*. Decoder 40*b* includes a logic circuit DEC whose output becomes logic "low" when the output of counter 44*a* becomes 19, i.e., 10011 in a binary system, and an AND gate G which logically multiplies second pulse signal p_vari with an output X of the logic circuit. Therefore, when the output of counter 40*a* becomes 19 or second pulse signal p_vari becomes a logic "low" state, an AND gate produces a reset signal R.

Therefore, counter 40*a* resets every 20 pulses of the 2 [MHz] clock and repeats a counting of 0 to 19.

As a result, although a designer has to configure twelve-bit binary counter in the case where a counter is designed with reference to a maximum time of the discharge maintenance time, e.g., 1280 [μs], according to the present invention, the five-bit binary counter can be utilized in the above case, so that a design of the counter is simplified and a noise problem can be eliminated.

As described above, in the present invention, a simplification of the design of the timing control apparatus and the decrease of a noise contribute to a cost reduction along with a reliability of the products.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A timing control apparatus of an alternating current plasma display system for respectively driving a plurality of subfields at every field in three steps such as a) entering a wall charge into a whole pixel for a first predetermined time in the initial stage of every subfield and eliminating an entered whole pixel; b) while sequentially scanning a plurality of scan lines for a second predetermined time at every subfield, entering a relevant data in the line of unit and selectively forming the wall charge at a pixel intended to be discharged; and c) commencing to discharge a pixel having the wall charge which is formed therein for a mutually different time at every subfield and maintaining a commenced discharge, said apparatus comprising:

a first clock generating means for generating a first clock signal having a high frequency for a data processing;

a second clock generating means for generating a second clock signal having a low frequency for a system driving;

a first counting means for counting the second clock signal in response to a vertical synchronizing signal, and for generating both a first pulse signal which sets the first and second predetermined times respectively in steps a) and b) in the respective subfield sections and a second pulse signal which sets times in step c) in the respective subfield sections which are different from one another;

a second counting means for counting the second clock signal to detect time intervals of sections in steps a) and b) in response to the first pulse signal;

a third counting means for counting the second clock signal in response to the second pulse signal to detect times in steps c) which are different from one another;

a first control signal generating means for inputting outputs of said second and said third counting means and the second clock signal, and for generating timing control signals to drive a scan electrode, a maintenance electrode and an address electrode; and a second control signal generating means for inputting both an output of said second counting means and the first clock signal, and for generating timing control signals to enter data.

2. The timing control apparatus as claimed in claim 1, wherein a frequency of said first and second clock signals are 50 [MHz] and 2 [MHz], respectively.

3. The timing control apparatus as claimed in claim 2, wherein said plurality of subfields are eight per one field so as to display 256 contrasts.

4. The timing control apparatus as claimed in claim 1, wherein said third counting means has a least time among the times in steps c), which are different from one another, as a unit time, and repeats a count of the second clock signal for the unit time.

5. The timing control apparatus as claimed in claim 4, wherein said third counting means comprises:

an N-bit counter for inputting and counting the second clock signal; and a resetting means for resetting said N-bit counter when an output value of said N-bit counter is equal to the unit time or when the second pulse signal is in a non-active state.

6. The timing control apparatus as claimed in claim 1, wherein said second control signal generating means decodes the output of said second counting means, divides a second predetermined time in step b) into a plurality of scan lines and counts said first clock signal for a unit time which corresponds to each of divided times.

7. The timing control apparatus as claimed in claim 6, wherein said second control signal generating means comprises:

an M-bit counter for inputting and counting the first clock signal; and a resetting means for resetting said M-bit counter when an output value of said M-bit counter is equal to the unit time or when the third pulse signal is in a non-active state.

8. The timing control apparatus as claimed in claim 7, wherein said third pulse signal maintains an active state for the second predetermined time excluding the first predetermined time of step a) in the first pulse signal.

9. A timing control method of an alternating current plasma display system for respectively driving a plurality of subfields at every field in three steps such as a) entering a wall charge into a whole pixel for a first predetermined time in the initial stage of every subfield and eliminating an entered whole pixel; b) while sequentially scanning a plurality of scan lines for a second predetermined time at every subfield, entering a relevant data in the line of unit and selectively forming the wall charge at a pixel intended to be discharged; and c) commencing to discharge a pixel having the wall charge which is formed therein for a mutually different time at every subfield and maintaining a commenced discharge, said method comprising the steps of:

i) generating both a first clock signal having a high frequency for a data processing and a second clock signal having a low frequency for a system driving;

ii) counting the second clock signal in response to a vertical synchronizing signal, and generating both a first pulse signal which sets the first and second predetermined times respectively in steps a) and b) in the respective subfield sections and a second pulse signal which sets times in step c) in the respective subfield sections which are different from one another;

iii) counting the second clock signal to detect time intervals of sections in steps a) and b) in response to the first pulse signal;

iv) counting the second clock signal in response to the second pulse signal to detect times in steps c) which are different from one another;

v) inputting outputs in steps (iii) and (iv) and the second clock signal, and generating timing control signals to drive a scan electrode, a maintenance electrode and an address electrode; and vi) inputting both the output in step (iii) and the first clock signal, and generating timing control signals to enter data.

10. The timing control method as claimed in claim 9, wherein a frequency of said first and second clock signals are 50 [MHz] and 2 [MHz], respectively.

11. The timing control method as claimed in claim 10, wherein said plurality of subfields are eight per one field so as to display 256 contrasts.

12. The timing control method as claimed in claim 9, wherein said step iv) has a least time among the times in steps c), which are different from one another, as a unit time, and repeats a count of the second clock signal for the unit time.

13. The timing control method as claimed in claim 9, wherein said step vi) decodes the output of said second counting means, divides a second predetermined time in step b) into a plurality of scan lines and counts said first clock signal for a unit time which corresponds to each of divided times.

* * * * *